United States Patent [19]

Gutleber

[11] 4,301,530

[45] Nov. 17, 1981

[54] ORTHOGONAL SPREAD SPECTRUM TIME DIVISION MULTIPLE ACCESSING MOBILE SUBSCRIBER ACCESS SYSTEM

[75] Inventor: Frank S. Gutleber, Little Silver, N.J.

[73] Assignee: The United States of America as represented by the Secretary of the Army, Washington, D.C.

[21] Appl. No.: 970,018

[22] Filed: Dec. 18, 1978

[51] Int. Cl.³ .............................................. H04J 13/00
[52] U.S. Cl. ...................................... 370/18; 370/19; 370/103
[58] Field of Search ......... 179/15 BC, 15 BA, 15 BP; 325/4; 370/18, 30, 50, 19, 108; 455/19, 12

[56] References Cited

U.S. PATENT DOCUMENTS

| | | | |
|---|---|---|---|
| 3,488,445 | 1/1970 | Chang | 179/15 BC |
| 3,715,508 | 2/1973 | Blasbalg | 179/15 BC |
| 3,908,088 | 9/1975 | Gutleber | 179/15 BC |
| 4,056,779 | 11/1977 | Toler | 455/19 |
| 4,117,267 | 9/1978 | Haberle | 455/12 |
| 4,164,628 | 8/1979 | Ward | 179/15 BC |

FOREIGN PATENT DOCUMENTS 2843189 4/1979 Fed. Rep. of Germany ........ 370/50

*Primary Examiner*—David L. Stewart
*Attorney, Agent, or Firm*—Nathan Edelberg; Jeremiah G. Murray; Edward Goldberg

[57] ABSTRACT

A time division multiple access mobile communications system employing frequency division multiplexing and perfect noise codes to enable utilization of the system. A central node, or repeater, is employed, with all transmissions to it being performed at a first frequency, and with the frequency division multiplexing being such that all re-transmissions from the central node are performed at a second, different frequency. The noise codes employed are of a type termed code mates having correlation functions which upon detection provide an impulse autocorrelation function. The described arrangement enables random access, or direct call-up, to be accomplished with total non-interference between users. Large improvements in signal-to-noise power ratio and in signal-to-jamming power ratio will be seen to result.

3 Claims, 4 Drawing Figures

ORTHOGONAL SPREAD SPECTRUM TIME DIVISION MULTIPLE ACCESSING MOBILE SUBSCRIBER ACCESS SYSTEM

The invention described herein may be manufactured and used by or for the Government for governmental purposes without the payment of any royalties thereon or therefor.

FIELD OF THE INVENTION

This invention relates to mobile communications systems and, more particularly, to a mobile subscriber accessing system utilizing direct call-up with omnidirectional antennas.

BACKGROUND OF THE INVENTION

As is well known and understood, one of the problems associated with mobile subscriber accessing systems offering direct call-up is that of interference between users. As is also well known and understood, this results from the utilization in such communications systems of omnidirectional antennas. Attempts at utilizing such antennas with very narrow pulses to reduce the probability of self-interference has been shown to be limited. Use of time division multiple accessing, by itself, has not completely solved the interference problem, as signals from moving transmitters often threaten the channel (or time slot) in which another signal is being received. Interference has especially been found prevalent when a call-up is first initiated, before any synchronized acquisition is first established. Although time division multiple accessing communications systems have been developed where directional antennas have been used (see, for example, my issued U.S. Pat. No. 3,908,088), it was not until my concurrently filed application entitled "Self-Adaptive Mobile Subscriber Access System Employing Time Division Multiple Accessing" issued as U.S. Pat. No. 4,215,244 on July 29, 1980 that a workable implementation has been proposed for the mobile arena where omnidirectional antennas are utilized.

SUMMARY OF THE INVENTION

As will become clear hereinafter, the mobile subscriber access system of the present invention represents an improvement over that described in my concurrently filed application by providing total non-interference between users in environments where very large numbers of subscribers are operating. As reference to such application will show, the system there described provides a self-adaptive feature which permits switching to vacant channels as interfering users move to an occupied channel. Thus, the elimination of self-interference will be seen to depend upon how quickly the self-adaptive feature can work, upon how quickly synchronous operation can be acquired, and upon how many subscribers begin transmitting at the same time. Analysis has indicated that where very large numbers of users will be accessing the system, the self-adaptive feature might not guaranty, at all times, the presence of a vacant channel to which to switch. As a result, some self-interference might still be present.

As will become clear hereinafter, however, the mobile subscriber access system of this invention employs frequency division multiplexing for users to transmit to a central node, or repeater, at a first frequency, with retransmissions therefrom to the intended recipient to be at a second frequency. Thus, individual transmissions from an adjacent user would not generally tend to produce interference in receivers operating at a different frequency. Additionally, the mobile subscriber access system will be seen to be orthogonal in operation, such that perfect (i.e., lobeless) noise codes could be utilized in the re-transmissions from the central node so that the intended recipient would respond only to communications signals addressed to it. A loop back synchronous timing scheme is employed to maintain a time reference for all of the mobile users, so as to keep the system orthogonal and ensure reception only to intended transmissions, with total non-interference. As will be seen, such an accessing system serves to provide jamming protection and range extension capabilities, as an added attraction. Whereas the mobile subscriber access system of my concurrently filed application would operate perfectly acceptably in its intended environment, the added complexity of utilizing the central node construction of this invention has been found necessary to maintain the high level of non-interference where very large numbers of subscribers are present, each of whom are using omnidirectional antennas in their accessing.

BRIEF DESCRIPTION OF THE DRAWINGS

These and other features of the present invention will be more readily understood from a consideration of the following description taken in connection with the accompanying drawings in which.

DETAILED DESCRIPTION OF THE DRAWINGS

Figure 1:
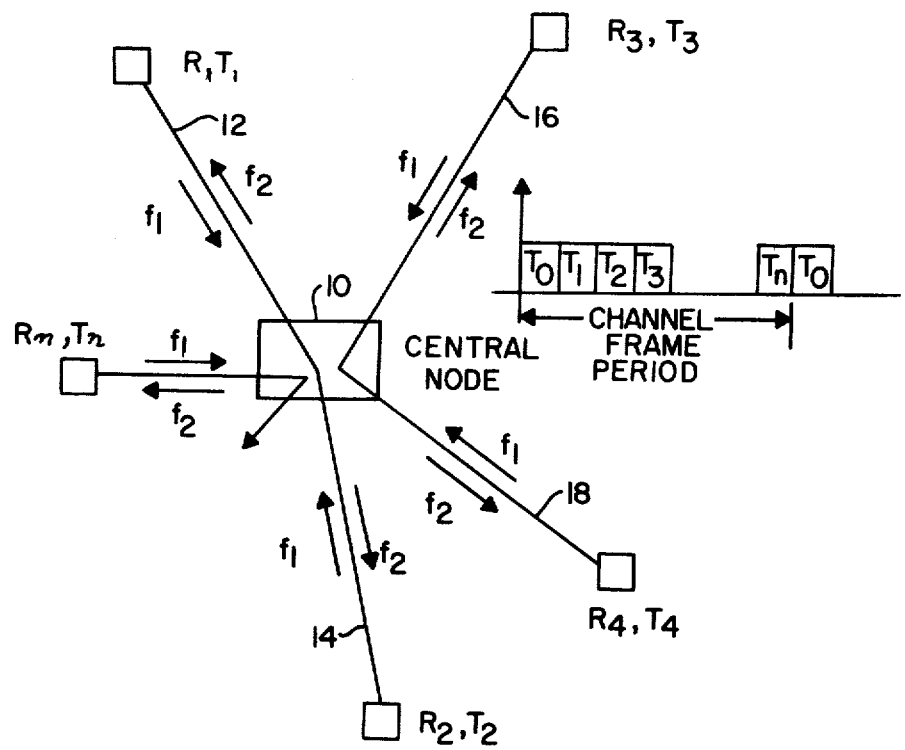
FIG. 1 is a simplified illustration of a ground mobile access system employing orthogonal time division multiple accessing according to the invention.

The arrangement of FIG. 1 pictorially illustrates a mobile subscriber access system employing time division multiple accessing established at a central node, or repeater, 10, with a synchronous time reference $T_0$. Such referencing may be accomplished in any appropriate manner, such that each mobile user communicates with another during an assigned channel (or time slot). Thus, one user $R_1,T_1$ transmits to a second user $R_2,T_2$ along the mobile links 12, 14 during the time slot $T_1$, a third user $R_3,T_3$ transmits to a fourth user $R_4,T_4$ along the mobile links 16, 18 during the time slot $T_2$, the user $R_5,T_5$ transmits to the user $R_6,T_6$ during the time slot $T_3$, etc. As indicated in FIG. 1, all transmissions to the central node 10 from the various subscribers are in a first frequency band $f_1$ whereas those transmissions from the central node 10 to the mobile subscribers are in a different frequency band $f_2$. Whether subscriber $R_1,T_1$ is connected with subscriber $R_2,T_2$ during time slot $T_1$, subscriber $R_3,T_3$ is connected with subscriber $R_4,T_4$ via time slot $T_2$, or via different time slots, it will be appreciated that each subscriber pair has their associated time slot (or pair of time slots for time-multiplexed duplex operation) established and maintained synchronous at the central node 10, or common station, 10. As such, transmission in the frequency band $f_1$ would not produce interference in receivers tuned to frequencies in the band $f_2$. This frequency division multiplexing to eliminate self-interference is of particular importance where very large numbers of subscribers are accessing the communications system.

Figure 2:
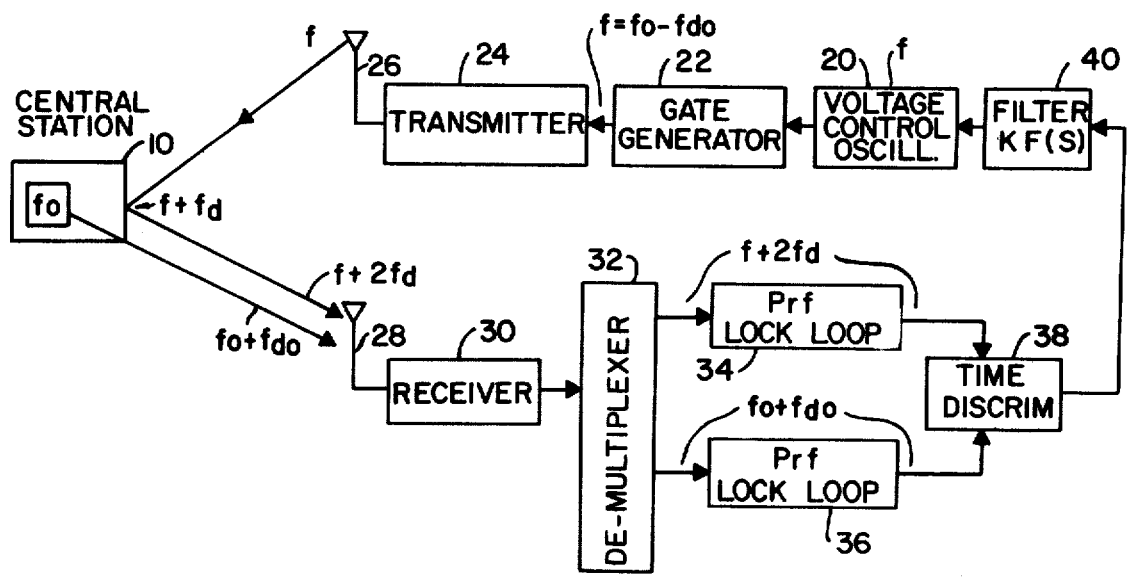
FIG. 2 is a functional block diagram showing the loop back synchronous timing control which maintains the various channels in the central node re-transmissions orthogonal.

In order to keep the various channels existing in the transmitted output from the central node 10 orthogonal, a loop back synchronous timing scheme is employed, as illustrated in FIG. 2. In general, a pulse timing signal developed by a voltage controlled oscillator 20 is coupled by a gate generator 22 to a transmitter 24 for radiation, as by antenna 26, at a frequency f towards the central station 10. Receiving such transmission with a doppler shift $f_d$, the central node 10 retransmits such signal to the receiving antenna 28, relative to the synchronous reference frequency $f_0$. The doppler shifted signals intercepted by antenna 28 with the frequencies $(f+2f_d)$ and $(f_0+f_{d0})$ are coupled through a receiver 30 and de-multiplexer 32, and a pair of prf lock loop circuits 34, 36, for a comparison of the phase or time of the transmitted signal against the clock standard pulse repetition frequency that is simultaneously received from the central node 10. The output of a time discriminator 38 coupled to the prf lock loop circuits 34, 36 controls, as by a filter 40, the voltage control oscillator 20 to a lock condition which occurs when its frequency is equal to $(f_0-f_{d0})$. When the transmission loop is thusly locked, the output of the time discriminator 38 is zero, and $$f+2f_d = f_0 + f_{d0} \tag{1}$$

Since the path to and from the central node, or common station, 10 is the same, $$f_d = f_{d0} \tag{2}$$

Therefore, $$f = f_0 - f_{d0} \tag{3}$$

Thus, the signal frequency received from each mobile subscriber at the central node 10 is $$f+f_d = f_0 - f_{d0} + f_{d0} = f_0 \tag{4}$$

such that time multiplexing is possible into any available time slot at the central station 10. As will be seen, the frequency of the voltage controlled oscillator 20 will be automatically and continuously changed until the loop-around transmission thus becomes synchronous. Since the foregoing system is orthogonal in operation, perfect (lobeless) noise codes will additionally be seen to be utilizable to great advantage.

As is described in my issued U.S. Pat. Nos. 3,461,451, 3,519,746 and 3,634,765, for example, a number of classes of codes (i.e., pairs of code signals termed code mates) have amplitudes and autocorretion functions which provide a peak output at a given time and a zero output (or outputs having the same magnitude but opposite polarity) at all other times. When the code mates are detected and the resultant detected outputs are linearly added, there is provided the impulse output of high amplitude at a given time and a zero output at all other times.

Figure 3:
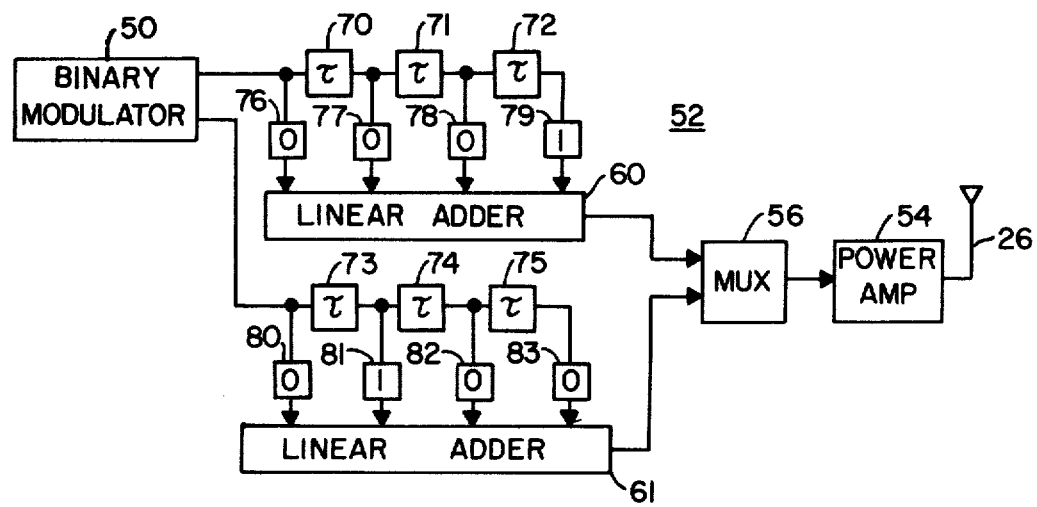
FIG. 3 is a functional block diagram of the transmitting portion of such a communications system for use with a multiplexed code constructed according to the invention.

To utilize multiplexed coding in the time division multiple access communications system of the invention, the gate generator 22 and transmitter 24 of FIG. 2 is replaced by the binary modulator 50, coder-multiplexer 52 and power amplifier 54 of FIG. 3. These units may be located at the mobile subscriber, with the modulator 50 and coder-multiplexer 52 comprising clock, synchronizing generator, code generator and mixing apparatus to provide propagation by the omnidirectional antenna 26. As will become clear from the discussion that follows, the coder-multiplexer 52 is designed such that code mate pairs are transmitted to the central node 10 which compress to a single impulse, lobelessly.

FIG. 3 symbolically shows a transmitter arrangement for the multiplexed coding system for use in an illustrative manner with mate code pairs which meet the autocorrelation requirements and in which:

Code (a) = 0001
Code (b) = 0100

Where:
0 indicates a plus (+)
1 indicates a minus (−)

The arrangement between the binary modulator 50 of FIG. 3 and the multiplex unit 56 will be understood to essentially comprise a matched filter configuration.

Referring, more particularly, to the construction of FIG. 3, it will be seen that a pair of linear adders 60, 61 are included, with the outputs of each being applied to one input of the multiplexer 56 for driving the power amplifier 54. The input signals to the adders 60, 61 on the other hand, are provided by means of a plurality of time delay circuits and by means of a plurality of phase control circuits. Specifically, the circuits 70, 71, 72, 73, 74, 75 each delay the detected code signal by one time slot of the synchronous timing cycle. The phase control circuits 76, 77, 78, 79, 80, 81, 82, 83 are of construction to provide a signal feedthrough either with 0° or 180° phase shift, depending upon the specific code mate operated upon. In FIG. 3, the circuits identified by the reference numerals 76, 77, 78, 80, 82, and 83 provide zero phase reversal for the code signal, whereas the circuits 79 and 81 provide the 180° phase reversal required. In the description that is shown, it will be understood that the inclusion of a "0" within these phase control circuits represents a signal feedthrough with zero phase alteration while the inclusion of a "1" indicates a phase reversal of 180°.

The compression of the code 0001 in the top portion of the matched filter of FIG. 3 is illustrated as follows, with the last line indicating the autocorrelation function from the adder 60.

| | Time Slot | 1 | 2 | 3 | 4 | 5 | 6 | 7 |
|---|---|---|---|---|---|---|---|---|
| | Pulse 1 | 1 | 1 | 1 | 0 | | | |
| | Comp. 0 | | 0 | 0 | 0 | 1 | | |
| | Filter 0 | | | 0 | 0 | 0 | 1 | |
| | 0 | | | | 0 | 0 | 0 | 1 |
| $\phi_a(\tau)$ | Filter Output | 1 | . | 0 | $0^4$ | 0 | . | 1 |

(In the foregoing table, it will be appreciated that the exponent indicates the amplitude.)

The compression of the code 0100 in the bottom portion of the matched filter of FIG. 3 is illustrated by the following table, where the last line indicates the autocorrelation function from the adder 61.

| Time Slot | 1 | 2 | 3 | 4 | 5 | 6 | 7 |
|---|---|---|---|---|---|---|---|
| Pulse 0 | 0 | 1 | 0 | 0 | | | |
| Comp. 0 | | 0 | 1 | 0 | 0 | | |

|   |   |   |   |   |   |   |
|---|---|---|---|---|---|---|
| Filter 1 |   | 1 | 0 | 1 | 1 |   |
|   |   | 0 |   | 0 | 1 | 0 | 0 |
| $\phi_b(\tau)$ Filter Output | 0 | . | 1 | $0^4$ | 1 | . | 0 |

The following table—and, specifically, the last line therein—illustrates the output signal of the multiplexer 56, showing that the linear sum of the orthogonally multiplexed matched filter outputs results in a compression of the composite code to a single impulse.

| Time Slot | 1 | 2 | 3 | 4 | 5 | 6 | 7 |
|---|---|---|---|---|---|---|---|
|  | 1 | . | 0 | $0^4$ | 0 | . | 1 |
|  | 0 | . | 1 | $0^4$ | 1 | . | 0 |
| $\epsilon$ | . | . | . | $0^8$ | . | . | . |

In applying the example code pairs in the time division multiple accessing system of the present invention, it will be helpful to first consider an uncoded system with three users accessing the system with the selected channels occupying the three time slots of one user in the first, third and fourth time slot positions. Different amplitudes and phases will be assumed for the separate users accessing the system to demonstrate that utilizing perfect noise codes enables the system to be performed with no self-interference even for large differences in received power levels. The amplitudes and phases of the three users will be assumed to be +2, +4 and −1.

With the three users occupying these time slots, the summed output will appear thusly:

| Time Slot | 1 | 2 | 3 | 4 |
|---|---|---|---|---|
| User #1 | $0^2$ |   |   |   |
| User #2 |   |   | $0^4$ |   |
| User #3 |   |   |   | 1 |
| $\epsilon$ | $0^2$ |   | $0^4$ | 1 |

The following table illustrates both the multiplexed code signals that would be transmitted by the three accessing users, as well as the linear sum of the coded signals as they would appear at the multiple access inputs of the central node 10. The code signal transmitted by user #2 will be seen to be of four times the amplitude and of the opposite polarity as the signal transmitted by user #3, while the code signal transmitted by user #1 will be seen to be of twice the amplitude and of the opposite polarity as the code signal transmitted by user #3.

| Time slot | −3 | −2 | −1 | +1 | +2 | +3 | +4 |
|---|---|---|---|---|---|---|---|
| User #1 | $0^2$ | $0^2$ | $0^2$ | $1^2$ |  |  |  |
| User #2 |  |  | $0^4$ | $0^4$ | $0^4$ | $1^4$ |  |
| User #3 |  |  |  | 1 | 1 | 1 | 0 |
| $\epsilon$(a) | $0^2$ | $0^2$ | $0^6$ | 0 | $0^3$ | $1^5$ | 0 |

The foregoing table representing the code (a) composite signal, can then be compared with the following table, representing the code (b) composite signal.

| Time Slot | −3 | −2 | −1 | +1 | +2 | +3 | +4 |
|---|---|---|---|---|---|---|---|
| User #1 | $0^2$ | $1^2$ | $0^2$ | $0^2$ |  |  |  |
| User #2 |  |  | $0^4$ | $1^4$ | $0^4$ | $0^4$ |  |
| User #3 |  |  |  | 1 | 0 | 1 | 1 |
| $\epsilon$(b) | $0^2$ | $1^2$ | $0^6$ | $1^3$ | $0^5$ | $0^3$ | 1 |

The only difference between the foregoing two tables being that the first represents the condition for the code (a) inputs while the second represents that for the code (b) inputs.

Pulse compressing the composite outputs in their respective matched filters, and linearly adding the results in the multiplexer 56 produces the following. As for pulse compressing the code (a) composite output:

|   | Time Slot | −3 | −2 | −1 | +1 | +2 | +3 | +4 | +5 | +6 | +7 |
|---|---|---|---|---|---|---|---|---|---|---|---|
|   | Pulse 1 | $1^2$ | $1^2$ | $1^6$ | 1 | $1^3$ | $0^5$ | 1 |  |  |  |
|   | Comp. 0 |  | $0^2$ | $0^2$ | $0^6$ | 0 | $0^3$ | $1^5$ | 0 |  |  |
|   | Filter 0 |  |  | $0^2$ | $0^2$ | $0^6$ | 0 | $0^3$ | $1^5$ | 0 |  |
|   | 0 |  |  |  | $0^2$ | $0^2$ | $0^6$ | 0 | $0^3$ | $1^5$ | 0 |
| $\phi_a(\tau)$ | Filter Output | $1^2$ | . | $1^2$ | $0^9$ | $0^6$ | $0^{15}$ | $1^2$ | 1 | $1^4$ | 0 |

Pulse compressing the composite output for code (b) results in:

|   | Time slot | −3 | −2 | −1 | +1 | +2 | +3 | +4 | +5 | +6 | +7 |
|---|---|---|---|---|---|---|---|---|---|---|---|
|   | Pulse 0 | $0^2$ | $1^2$ | $0^6$ | $1^3$ | $0^5$ | $0^3$ | 1 |  |  |  |
|   | Comp. 0 |  | $0^2$ | $1^2$ | $0^6$ | $1^3$ | $0^5$ | $0^3$ | 1 |  |  |
|   | Filter 1 |  |  | $1^2$ | $0^2$ | $1^6$ | $0^3$ | $1^5$ | $1^3$ | 0 |  |
|   | 0 |  |  |  | $0^2$ | $1^2$ | $0^6$ | $1^3$ | $0^5$ | $0^3$ | 1 |
| $\phi_b(\tau)$ | Filter Output | $0^2$ | . | $0^2$ | $0^7$ | $1^6$ | $0^{17}$ | $1^6$ | 0 | $0^4$ | 1 |

The linear sum of the two matched filter outputs then yields:

| Time Slot | −3 | −2 | −1 | +1 | +2 | +3 | +4 | +5 | +6 | +7 |
|---|---|---|---|---|---|---|---|---|---|---|
| $\epsilon\phi_a(\tau)$ | $1^2$ | . | $1^2$ | $0^9$ | $0^6$ | $0^{15}$ | $1^2$ | 1 | $1^4$ | 0 |
| $\epsilon\phi_b(\tau)$ | $0^2$ | . | $0^2$ | $0^7$ | $1^6$ | $0^{17}$ | $1^6$ | 0 | $0^4$ | 1 |
| $\epsilon\phi_T(\tau)$ | . | . | . | $0^{16}$ | . | $0^{32}$ | $1^8$ | . | . | . |

The two major factors to note from this last table are that the compressed information bits are totally non-interfering and the signal voltage received at the central node 10 is eight times greater than for an uncoded time division multiplex accessing system. This factor of eight is simply the time-band width product or, equivalently, the number of noise code bits contained in each information bit. This increase of eight times in the signal voltage provides the advantageous result of increasing signal-to-noise power ratio by that same factor, as well as the signal-to-jamming power ratio in a hostile environment.

Figure 4:
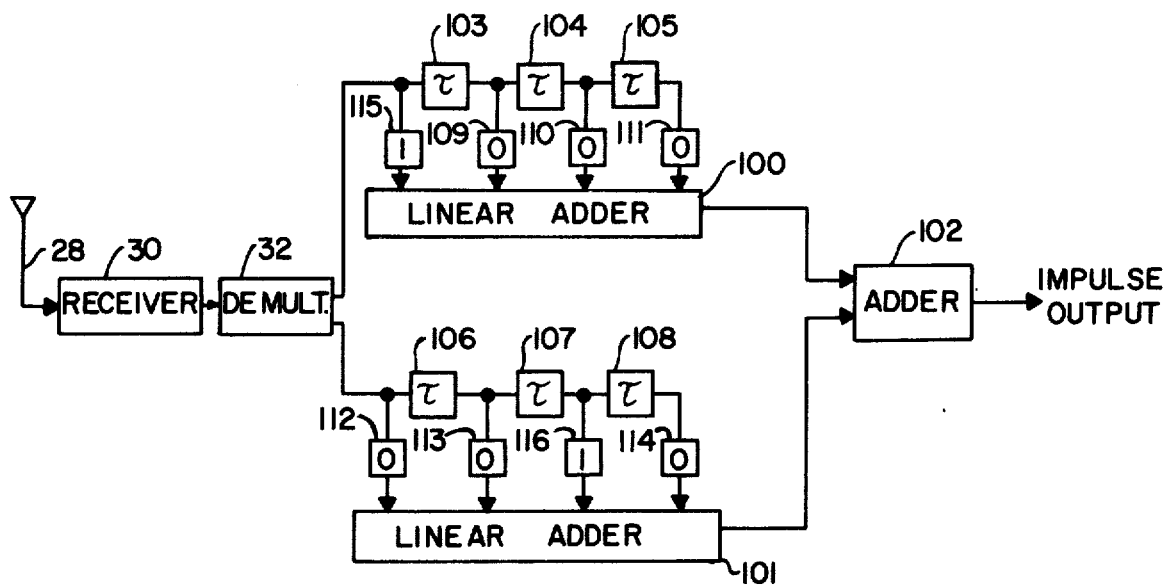
FIG. 4 is a functional block diagram of the receiving portion of such a communications system for use with the multiplexed code employed in FIG. 3.

In usage, a gated automatic gain control loop will be employed to adjust the individual channel signals to the same level for re-transmission from the central node 10 to the individual mobile users. The composite group of time division multiple access system channels would then be noise coded in a similar manner, again as a multiplexed noise code pair (either of the same noise code structure, or in a different noise code structure). Similar demultiplexing and matched filter detection would be employed in each receiver of the subscriber to result in the total non-interference with reception of all channel signals. The individual subscriber would then simply gate out the selected time slot intended for him prior to demodulation of the information, thereby providing an output that is totally non-interfered with by the other subscribers in the system and which thus simultaneously provides a protection against jammers equal to the number of accesses, with no required increase in band width. In FIG. 4, the receiver structure is shown for use with the generated noise code pair in FIG. 3, with three adders 100, 101, 102, time delay circuits 103, 104, 105, 106, 107, 108, with 0° signal feedthrough phase control circuits 109, 110, 111, 112, 113, 114, and with 180° phase reversal control circuits 115, 116. Analysis similar to that described with the foregoing tables would show that the information bits produced as an output from the adder 102 would be totally non-interfering, and with its received signal voltage being increased by a factor of eight. The result of using the perfect noise codes, therefore, will be seen to optimize transmission efficiency, while at the same time obtaining a large degree of anti-jamming protection.

While there has been described what is considered to be a preferred embodiment of the present invention, it will be readily apparent to those skilled in the art that modifications may be made by implementation of different perfect code mates and yet still provide the improvements in signalling and power characteristics which result. To carry out the teachings herein, all that would be necessary would be to select the perfect code mate pairs to be used and to arrange the phase control circuits of FIGS. 3 and 4 in appropriate relationship with respect to them. Alternatively, multi-dimensional codes could be utilized in the proposed system, as multiplexed codes which are time coded concurrently with generating a multiplexed binary code pair to provide a composite (i.e., multi-dimensional) code structure which retains zero lobes in the time domain while simultaneously providing very low side-lobes throughout the ambiguity diagram. Such multiplexed codes are more particularly described in my U.S. Pat. No. 3,917,999.

I claim:

1. A mobile subscriber system comprising:
   a plurality of subscriber stations each of which is assigned a respective distinct time interval within a channel frame period for transmission and reception;
   a separate transmitter means at all of said subscriber stations for transmitting communication carrier signals omnidirectionally at a first frequency common to all said transmitter means, said transmitter means including a code multiplexer applying the same multiplexed code signals to said transmitter within the respective assigned time interval; a central node station including carrier frequency translation means for retransmitting said code signals at a second carrier frequency relative to a reference frequency without change of relative timing; receiver means at each of said subscriber stations for receiving code signals transmitted by said control node at said second carrier frequency which is common to all of said receiver means; each of said receiver means including means for detecting said retransmitted code signals to produce an output signal occuring only during the respective time interval within the corresponding channel frame period, and means at each subscriber station for synchronizing timing of that station's code signals retransmitted from said central node station with said reference frequency, by controlling that station's transmitter frequency.

2. The mobile subscriber system of claim 1 wherein said transmitter means includes a voltage controlled oscillator; and said synchronizing means includes phase comparison means responding to said reference frequency signal transmitted from said central node and to said code signals retransmitted from said central node to provide a control voltage to said oscillator for locking the oscillator of the respective transmitter means to the frequency of the reference frequency signal at said central node.

3. The mobile subscriber system of claim 2 further including a time discriminator receptive of said detected signals for deriving said control voltage for said voltage controlled oscillator.

* * * * *